US005553313A

United States Patent [19]

Klos

[11] Patent Number: 5,553,313

[45] Date of Patent: Sep. 3, 1996

[54] METHOD FOR DETECTING INFORMATION IN A RDS DATA FLOW

[75] Inventor: Rainer Klos, Ettlingen, Germany

[73] Assignee: Becker GmbH, Germany

[21] Appl. No.: 326,643

[22] Filed: Oct. 20, 1994

[30] Foreign Application Priority Data

Nov. 10, 1993 [DE] Germany .......................... 43 38 412.9

[51] Int. Cl.[6] .................................................. H04B 7/00

[52] U.S. Cl. ........................................ 455/51.1; 455/186.1

[58] Field of Search ..................................... 375/365, 366, 375/368, 369; 455/51.1, 186.1, 343, 38.3, 39, 67.1, 185.1; 370/100.1, 105.1, 105.3, 106

[56] References Cited

U.S. PATENT DOCUMENTS

| | | | |
|---|---|---|---|
| 4,652,875 | 3/1987 | Waki | 455/343 |
| 5,252,963 | 10/1993 | Snowden et al. | 455/343 |
| 5,390,343 | 2/1995 | Rupprecht et al. | 455/186.1 |

FOREIGN PATENT DOCUMENTS

| | | |
|---|---|---|
| 3510562C2 | 9/1986 | Germany . |
| 3540572 | 8/1987 | Germany . |
| 0304815B1 | 3/1989 | Germany . |
| 3728792 | 3/1989 | Germany . |

*Primary Examiner*—Reinhard J. Eisenzopf
*Assistant Examiner*—Nguyen Vo
*Attorney, Agent, or Firm*—Westman, Champlin & Kelly, P.A.

[57] ABSTRACT

An apparatus for the detection of information expected to be present in a defined data block of a RDS data flow transmitted as a predetermined number of groups which periodically follow one another, with a radio receiver tuned-in one after the other to a number of senders to be tested and whose RDS decoder is synchronized with the RDS data flow of the respective tuned-in sender. A running counter is provided having the frequency of the RDS data cycle and which is respectively reset upon reaching a count status corresponding to the period of a number of groups.

6 Claims, 3 Drawing Sheets

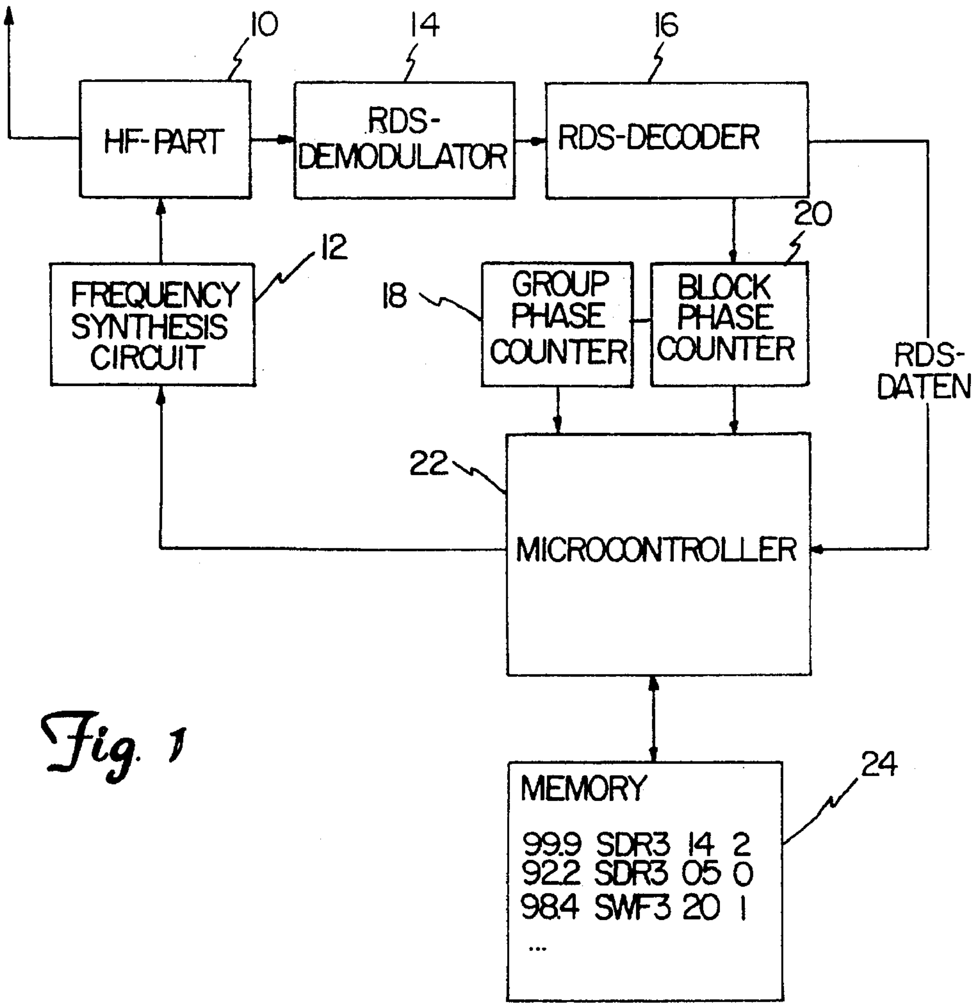
Fig. 1
Fig. 2
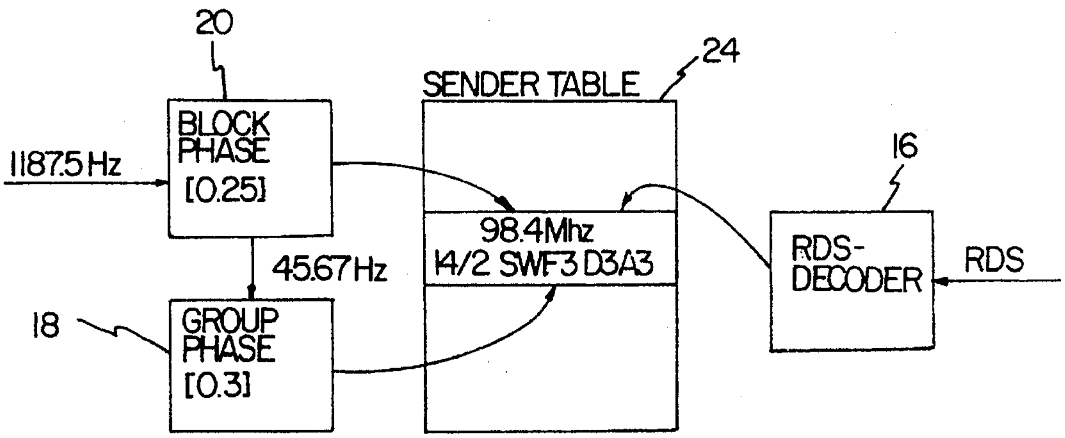

Fig. 4
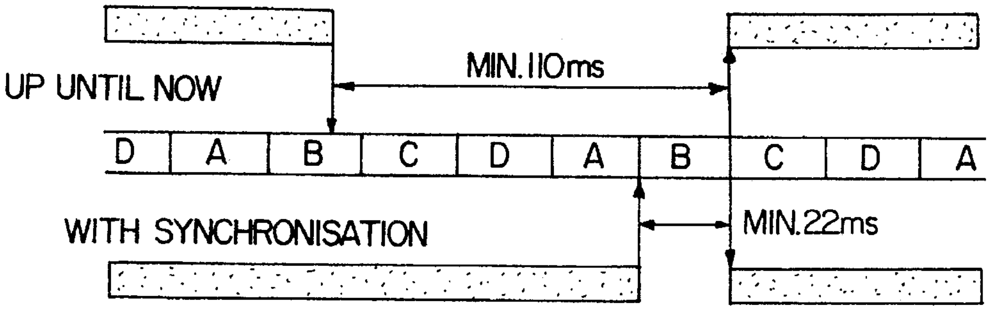
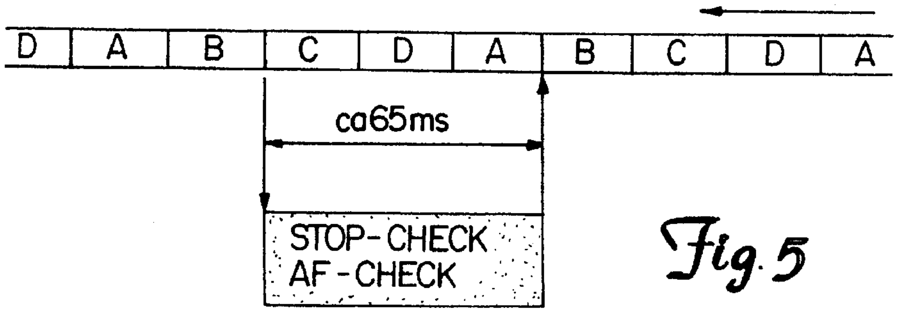
Fig. 5
Fig. 6
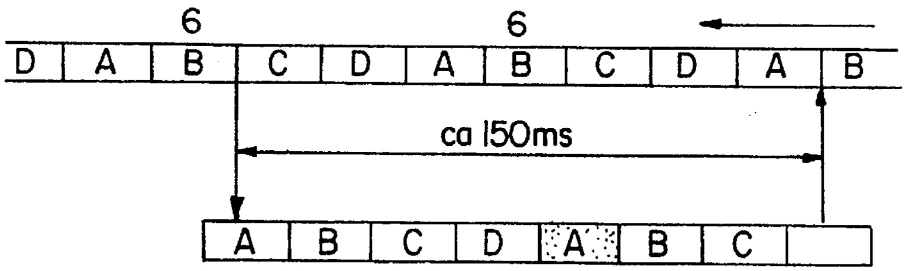

METHOD FOR DETECTING INFORMATION IN A RDS DATA FLOW

BACKGROUND OF THE INVENTION

The invention relates to a method for the detection of information expected to be present in a defined data block of the RDS data flow transmitted as a predetermined number of periodic sequential groups. The information is detected by a radio receiver which is tuned-in, one after the other, to a number of senders to be tested or monitored, and whose RDS decoder is synchronized with the RDS data flow of the respective tuned-in sender.

Radio receivers having a particular function capable of selecting the sender, in particular, car radios, have at their disposal a separate receiver part which constantly searches in the background for acknowledged senders or, when required, monitors regularly freely definable radio senders which transmit traffic announcements. When monitoring the receivable senders, the RDS information, transmitted at an increasing degree from the sender stations, is evaluated. The receivers working in the background, must permanently tune-in to many different RDS senders and evaluate the RDS data. It is often the case that only defined RDS information is of interest, for example, a broadcast or announcement identification signal by a traffic radio sender or an alternative frequency. Since this information is transmitted in defined data blocks of the RDS data flow, the particular data block is not received until after the respective tuning-in to a sender and the synchronization of the RDS decoder to the received RDS data flow.

From DE 35 10 562 C2, a method is known for retrieving the RDS data flow, as well as, a RDS demodulator for carrying out this method. Here, the RDS demodulator actually attains an excellent safety against disturbances or noise however, the RDS decoder which follows on from the demodulator, requires a considerable time to lock-in to the RDS data flow due to the fact that information on the phase relation of the Radio Data System (RDS) data flow is neither made available by the demodulation nor by the decoding. The more often the frequency must be changed in order to identify or to check different senders, the more time is lost for the respective necessary synchronization of the RDS decoder with the RDS data flow. The time necessary for the synchronization, as well as, the time interval required until the information expected in a defined data block appears, is therefore not made available for other activities. For example, should a traffic radio sender be monitored for the existence of an announcement identification signal (TE), then each time only a single Bit in the B-block of the RDS data flow is to be evaluated. From the tuning-in of a particular traffic radio sender via the synchronization of the RDS decoder until the appearance of the searched for B-block, whose position in the received RDS data flow is not known beforehand, a time interval of more than 100 msec. can have expired. However, for evaluation of the B-block alone, a time interval of no more than 20 msec. is sufficient.

The object of the invention is to provide a method for aimed detection of information in the RDS data flow with which, the greatest portion of the time, needed up until now, for the synchronization and for binding the data block, is spared and is made available for other activities.

SUMMARY OF THE INVENTION

According to the method of the invention for aimed detection of information in the RDS data flow:

a) a counter, incremented by way of the RDS clock cycle and whose count stand has a random relation to the block sequence of the RDS data flow, is respectively reset upon reaching a count stand corresponding to the number of bits of a group;

b) upon carrying out synchronization of the RDS decoder with the RDS data flow of the respective tuned-in sender, the count stand of the counter is set in relation to the block sequence of the received RDS data flow and a reference number characterising this relation is stored in a sender table along with characteristic data on this tuned-in sender;

c) upon newly tuning-in to a sender whose characteristic data along with the related reference number are already recorded in the sender table, no synchronization of the RDS decoder is carried out and the temporal position of the data block, in which the information is expected, is calculated from the actual count stand and the reference number of the tuned-in sender read out from the sender table.

With this method, the synchronization of the RDS decoder with a sender to be received is respectively carried out only once. By renewed tuning-in to the same sender, for example, for monitoring or checking a traffic radio sender for the appearance of an announcement identification signal, the point in time of the existence of the data block, which is being searched for, can be determined beforehand with the help of the reference numbers stored in the sender table. Only then at this point in time is the tuning-in carried out for tuning-in the receiver part, which operates in the background, to the sender which is to be monitored.

For the reference numbers, a determined count stand is preferably stored. This can be at the start of a reference data block in the RDS data flow of the respective tuned-in sender, for example, the first data block in a group, such as the A-block, or any other count stand, which corresponds to the start of a determined, searched for data block in the RDS data flow of the respective tuned-in sender, for example, the B-block when an announcement identification signal is to be checked. The first method offers a greater flexibility and presents self when more than just one data block is to be evaluated. The temporal position of the desired data block can than be calculated starting from the count stand stored as the reference number. The second method is effective when only one data block is respectively evaluated since the count stand stored as the reference number can be directly used as a criterium for the tuning-in of the sender to be monitored. The tuning-in to the sender to be monitored is carried out with the matching of the count stand of the freely running counter with the count stand of the stored reference number.

Particularly effective is the use of a counter constructed correspondingly to the sequence of the data in the RDS data flow comprising of a block phase counter and a group phase counter, whereby the count range for the block phase counter is determined by the number of bits in a block and the count range for the group phase counter, which is incremented with overflow of the block phase counter, is determined by the number of blocks in a group. The reference number is then stored as a combination of block phase and group phase.

The RDS data are transmitted, as known, in periodic groups of different group types. Relevant information is often located only in groups of a particular type. In such Eases, according to the preferred embodiment of the method, the tuning-in to a sender to be monitored is carried out at the point in time when the searched for data block in a group of the desired type, first appears. Since the group types periodically follow one another, with the help of the stored reference numbers, it can be calculated in advance at which point in time the desired data block in a group of the desired type will appear.

BRIEF DESCRIPTION OF THE DRAWINGS

Reference is now made to the drawings for further explaining the method according to the invention:

FIG. 1 shows a schematic block diagram of a receiver for carrying out the method;

FIG. 2 shows a functional diagram which illustrates the substantial steps of the method;

FIG. 4 shows a schematic comparison of the conventional method and the method according to the invention, for decoding defined information in the RDS data flow;

FIG. 5 shows an example of an application of the method; and

FIG. 6 shows a further example of an application for the method.

DETAILED DESCRIPTION OF THE PREFERRED EMBODIMENTS

Figure 3:
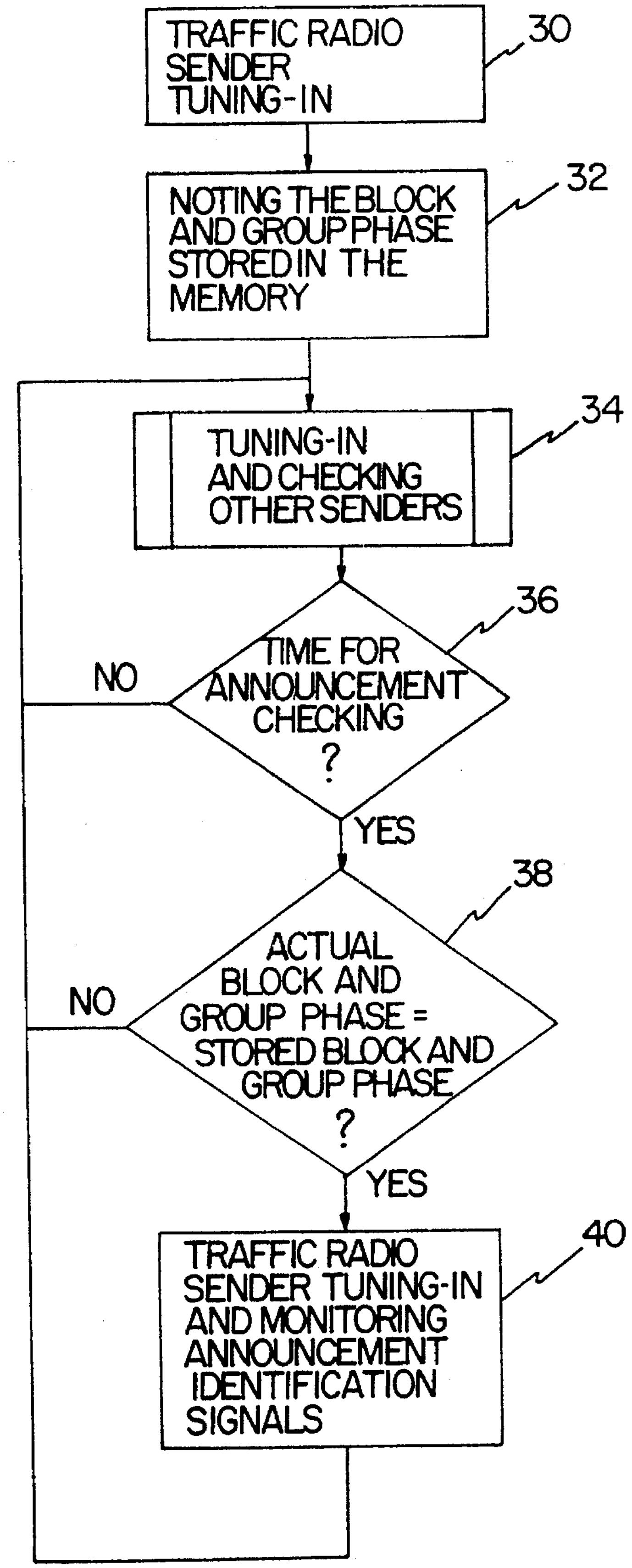
FIG. 3 shows a flow diagram of the operation of a background receiver with the monitoring of announcement identification signals from traffic radio senders.

In the following description, a radio receiver of a car radio is assumed which has available an additional receiver part, operating in the background, whose task lies in identifying senders which are to be received, checking alternative frequencies, evaluating the RDS data flow and, if desired, monitoring defined traffic radio senders for the existence of announcement identification signals. With such a radio receiver it is possible to tune-in the main receiver, working upfront, to any desired sender and connect through, when desired, to traffic announcements recognised by the background operation or to store these announcements in-between and than to betch at a later point in time. FIG. 1 only shows the receiver part which operates in the background. This part contains a HF-receiver part 10 whose tuning-in stage is controlled by a frequency synthesis circuit 12, a RDS demodulator 14 follows and whose output controls a RDS decoder, two cascade counters 18, 20 which are incremented by the data cycle produced by the RDS decoder, a microcontroller 22, as well as, a memory 24. The counter 20 is a block phase counter which is incremented by the RDS data cycle of the RDS decoder 16 and counts from 0 to 25, and the counter 18 is a group phase counter which counts from 0 to 3 and is incremented with overflow of the block phase counter 20. The frequency of the RDS data cycle is 1187.5 Hz. For every sender which is received and tested, information is stored in the memory 24 which will now be explained in more detail with reference to FIG. 2.

When tuning-in the HF receiver part 10 to a sender which has not yet been checked, the synchronization of the RDS decoder with the received data flow is first of all carried out. This synchronization which can be carried out according to a conventional method requires a time interval of at least around 110 msec. As soon as the synchronization is carried out, the data block which has just been received is set in relation to the random dependent count stand of the counters 18, 20. With the application example being discussed, traffic radio senders should be monitored for the appearance of announcement identification signals. In addition, a bit in the B-block must be monitored. Then the count stand of the counters 18, 20 at the start of the received B-data block is established and is stored in the memory 24 together with the most important characteristic data of the received sender. The count stand is recorded as a combination of the count stands of the block phase counter 20 and the group phase counter 18 which is the information 14/2 in the example shown in FIG. 2. The same step is carried out for every received and checked sender so that a sender table is formed in the memory 24 which contains a count stand as a reference number for each received sender and which is releated to the start of a B-data block.

Should now a sender, which is already recorded in the sender table, be newly monitored then the related count stand is taken out from the sender table where upon reaching this count stand, the tuning-in to the sender is then carried out. A renewed synchronization to the RDS data flow of the sender is not necessary and, as a result, the time normally required for this step is saved.

FIG. 3 shows the substantial steps for the application example being assumed. In step 30, the first ever tuning-in of the HF-receiver part 10 to the captured traffic radio sender is carried out. Step 32 carries out the synchronization of the RDS decoder 16 to the received RDS data flow. At the same time, the count stand of the counters 18, 20 for the start of the B-data block is stored in the memory 24 along with the most important characteristic data of the received sender. In the continuous loop which follows, in the step 34 the HF receiver part is tuned-in, one after the other, to other senders to be received and tested. In step 36, when it has been established that a determined time interval has passed which means the monitoring of a defined traffic radio sender for the existence of an announcement identification signal is brought about, then step 38 is tested to see if the actual count stand of the counters 18, 20 coincides with the entry in the memory 24 for the particular sender. If there is coincidence, the tuning-in to the particular traffic radio sender is carried out in step 40 whose B-data block is then evaluated in a more concentrated way. Finally with step 34, the monitoring of other senders is continued.

FIG. 4 illustrates this method in comparison with the prior art. According to the conventional method, with every tuning-in to a sender, a random data block is received which, in the given example, is the B-data block. The synchronization of the RDS decoder can be reached at the earliest after receiving a complete group of four blocks, that is, at the earliest after 110 msec. Only then can the evaluation of the next B-data blocks be carried out. With the method according to the invention, identified in FIG. 4 as 'with synchronization', the tuning-in to the traffic radio sender to be tested takes place, on the other hand, exactly at the start of receiving a B-data block which can then be directly evaluated within a time interval of not more than its duration.

FIG. 5 illustrates the assumed RDS data flow which in the drawing runs from right to left. When the respective B-data block is to be tested, a time interval of around 65 msec. between two successive B-data blocks is made available which is sufficient in order to, for example, test, during the search for a sender, the acknowledgment of receipt of a sender (stop signal) or to test an alternative frequency with respect to the sender which is right upfront.

An even longer time interval is made available for other types of activities of the receiver part operating in the background when it is made use of the situation that the information relevant for defined purposes is normally not transmitted in all the groups but rather only in groups of a determined group type. As such, traffic radio information is transmitted from the sender stations normally only in every third group. When this is known or it is established with the testing of the tuned-in sender, then according to the example shown in FIG. 6 the testing of the B-data block can be restricted to the groups of the associated group types. With the condition shown in FIG. 6, by testing a B-data block it would be established that this condition belongs to a group of the group type "6" which contains no traffic radio data. Since it is known that at least a further group follows which is not relevant, which in the given example is likewise of the type "6", the evaluation of the next B-data block can be omitted. The B-data block which then follows on is evaluated so that a time interval of around a 150 msec. is made available which is sufficient in order to test another sender which in the given example is the PI-code of the sender contained in the A-block.

The described examples concern the permanent monitoring of announcements from traffic radio senders. The invention is however equally well-suited for the aimed detection of other types of information in the RDS data flow. Another application with a car radio is the aimed detection of information via alternative frequencies of senders which have already been captured. Generally, with the described method, aimed synchronization of the RDS decoder, without requiring constant new synchronization, to information of every intended type and in every group type associated with the expected information, is included. In all applications, not only is the time gain an advantage, since there is no need for the constant new synchronization of senders which have already been tested, but there is also an increase in the safety of the RDS decoding since a single effected synchronization remains upheld.

I claim:

1. A method for detecting information expected to be present in a defined data block of an RDS data flow, transmitted as a predetermined number of groups which follow one another periodically, with a radio receiver tuned-in, one after the other, to a number of senders to be tested and whose RDS decoder is synchronized with the RDS data flow of the respective tuned-in sender, comprising:

a) a counter, incremented by an RDS clock cycle and whose count status has a random relation to a block sequence of the RDS data flow, is respectively reset upon reaching a count status corresponding to one of the number of bits in a group;

b) upon carrying out synchronisation of the RDS decoder with the RDS data flow of the respective tuned-in sender, the count status of the counter is set in relation to the block sequence of the received RDS data flow and a reference number characterising said relation is stored in a sender table along with characteristic data on the tuned-in sender; and c) with renewed tuning-in to a sender whose characteristic data along with the related reference number are already recorded in the sender table, a synchronization of the RDS decoder does not take place and the temporal position of the data block, in which the information is expected to be, is calculated from the actual count status and the reference number of the tuned-in sender read out from the sender table.

2. The method according to claim 1, characterised in that a count status is stored as the reference number corresponding to the start of a reference data block in the RDS data flow of the respective tuned-in sender.

3. The method according to claim 1, characterised in that a count status is stored as the reference number corresponding to the start of a defined data block in the RDS data flow of the respective tuned-in sender.

4. The method according to claim 1, characterised in that the counter is comprised of a block phase counter and a group phase counter, that the count range of the block phase counter is determined by the number of bits in a block of the RDS data flow, and that the group phase counter is incremented with overflow of the block phase counter and has a count range given by the number of blocks in a group of the RDS data flow.

5. The method according to claim 1, characterised in that the tuning-in to a sender whose characteristic data with the related reference number are already recorded in the sender table, is carried out at the point in time when the next defined data block appears in the RDS data flow of said sender.

6. The method according to claim 1, characterised in that the tuning-in to a sender whose characteristic data with the related reference number are already recorded in the sender table, is carried out at the point in time when the next defined data block appears within a group of a defined group type in the RDS data flow of said sender.

* * * * *